United States Patent [19]

Osanai

[11] Patent Number: 4,814,922
[45] Date of Patent: Mar. 21, 1989

[54] RECORDING AND REPRODUCING APPARATUS USING FLEXIBLE DISC

[75] Inventor: Eiji Osanai, Kanagawa, Japan

[73] Assignee: Canon Kabushiki Kaisha, Tokyo, Japan

[21] Appl. No.: 46,274

[22] Filed: May 5, 1987

[30] Foreign Application Priority Data

May 16, 1986 [JP] Japan .............................. 61-112057
May 16, 1986 [JP] Japan .............................. 61-112058
Jan. 30, 1987 [JP] Japan .............................. 62-18155

[51] Int. Cl.$^4$ .............................................. G11B 15/60
[52] U.S. Cl. ................................. 360/130.3; 360/110; 360/130.34
[58] Field of Search ........... 360/130.3, 130.31, 130.34, 360/110, 123, 125, 129

[56] References Cited

U.S. PATENT DOCUMENTS 4,652,959  3/1987  Hamada ........................... 360/130.3
4,710,837  12/1987  Matsumoto ........................ 360/110

Primary Examiner—John H. Wolff
Attorney, Agent, or Firm—Robin, Blecker & Daley

[57] ABSTRACT

A recording or reproducing apparatus includes a recording or reproducing head for recording or reproducing information in sliding contact with a rotating flexible disc, and a stabilizer member disposed opposite to the head with the disc put between them. On the stabilizer member, a groove is formed for recessing the moving of the head at the position facing the disc, and on both sides of the groove or on the downstream side in the rotating direction of the disc, a slant is formed for generating positive pressure in the direction of pressing the head to the facing disc. The groove and the slant are formed in conformity with the deformation of the disc due to the sliding contact with the disc.

27 Claims, 6 Drawing Sheets

RECORDING AND REPRODUCING APPARATUS USING FLEXIBLE DISC

BACKGROUND OF THE INVENTION

1. Field of the Invention

This invention relates to a recording and reproducing apparatus using a flexible disc as sheet as a recording medium and more particularly to a recording and reproducing apparatus for stabilizing headtouch by utilizing air flows caused by the rotation of the sheet.

2. Description of the Related Art

Conventionally, in this type of recording and reproducing apparatus mentioned above, when a recording or reproducing head (hereinafter referred to as "head") appproaches a disc rotating at a high speed, stable and sound opposing conditions between the head and the disc will not be maintained due to air flows generated by the rotation of the disc, causing deficiencies such as deteriorating a recording or reproducing capability.

To solve this problem, the efforts have been made to maintain stable and sound opposing conditions between not only the head and the disc but a stabilizer member and the disc by installing the stabilizer member facing the head with the disc put between them to generate air flows by the rotation of the disc.

Figure 15:
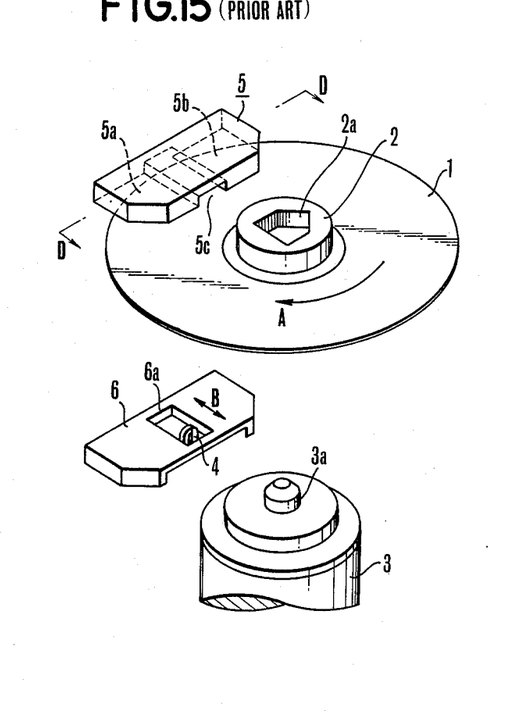
FIG. 15 is a perspective view of a recording or reproducing apparatus using a conventional stabilizer member.

FIG. 15 shows an illustration of an apparatus of this kind in the prior art.

Figure 16:
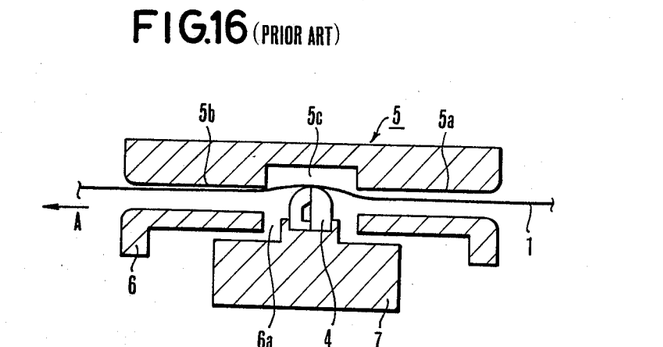
FIG. 16 is a longitudinal cross-section view of the portions adjacent to the head of the recording or reproducing apparatus using a conventional stabilizer member.

In FIG. 15, 1 is a flexible disc serving as a recording medium. For example, it is a magnetic disc, and a center core 2 such as of plastic make is attached to the center of the disc 1. The disc 1 is installed to a spindle 3a of a disc rotating motor 3 at a center hole 2a of the center core 2, and is rotated, for example, in the direction of arrow A at a predetermined speed (for example, 3600 rpm for a still video recording or reproducing apparatus). 4 is a recording or reproducing head. For example, it is a magnetic head supported by a head moving carriage 7 (FIG. 16) and is moved in the radial direction of the disc 1 by the moving carriage 7 as shown by arrow B in FIG. 15. In this mechanism, concentric or conical recording track is formed on a recording surface of the disc 1 when recording a signal. As mentioned above, 5 is a stabilizer member installed opposite to the head 4 with the disc 1 put between them to stabilize the part of the disc 1 which goes through the head 4. As mentioned in detail in FIG. 16, the stabilizer member 5 has a concave groove 5c with a rectangular cross section of a predetermined opening width on the opposite surface of the disc in conformity with the moving path of the head 4 in the direction of arrow B in FIG. 15 to evade collision with the head 5, thereby dividing the disc facing surface into an upstream side facing surface 5a and a downstream side facing surface 5b with the concave groove 5c forming the boundary. A back plate 6 having a long hole 6a is installed as required. The head 4 is extruded to the side of the disc 1 through the long hole 6a.

As described above, the stabilizer member 5 is closely faced with the upper side of the disc 1 as shown in FIG. 15, that is, the opposite side of the recording surface. On the other hand, as for the head 4, the extreme end of the head 4 is slightly protruded into the concave groove 5c of the stabilizer member 5, or is protruded to face the recording surface of the disc 1 to keep the same level with the facing surfaces 5a and 5b. The back plate 6 faces the recording surfaces of the disc 1 at a longer distance than the stabilizer member 5. When the disc 1 is rotated in the direction of arrow A in such a condition, the following phenomena will happen: positive pressure is originated between the disc 1 and the upstream side facing surface 5a of the stabilizer member 5, where the disc 1 is pressed down. On the other hand, negative pressure is originated between the disc and the downstream side facing surface 5b, causing the disc 1 to be attracted to the stabilizer member 5 against the rigidity of the disc 1. As the result of this, the downstream side facing surface 5b of the stabilizer member 5 and the disc 1 are liable to contact each other, and when both 5 and 1 contact each other, the situations such as impeding the stabilization of facing conditions between the head 4 and the disc 1 and scratching on the facing surface 5b of the stabilizer member 5 by abrasive materials (for example $SiO_2$, $TiO_2$) contained in the binder of the magnetic layers of the disc 1 occur. And in some cases, a servo mechanism can not function properly due to an abnormal load applied to the motor 3 which rotates the disc 1 as the free abrasive meterials torn off from the disc 1 through contacting stick to the scratches on the stabilizer member 5 and deteriorate the surface of the stabilizer member 5. Also, in some cases, the abrasive materials struck to the stabilizer member 5 expedite tearing off of the abrasive material contained in the binder of the magnetic layers of the disc 1 and the torn off abrasive materials also expedite wear of the head 4 by getting into the adjacent of head 4.

All these phenomena are derived from contacting of the disc 1 with the stabilizer member 5 through the negative pressure. As a means to solve the above mentioned problems, an apparatus has been improved to press the disc to the head side with air flows through the rotation of the disc by forming a slant face on the adjacent of the groove of the stabilizer member facing with the disc. (Technical Report, TV Association, TEBS 100-4, pages 20-21, submitted by Matsushita Electric dated Dec. 13, 1984).

According to this method, however, both the upstream side and the downstream side of the grooved part have slant faces, but actually, as the disc deforms by sliding contact with the head, it is necessary to establish the position and the configuration of the slant face in conformity with the deformed configuration of the disc, and merely forming a slant on the stabilizer member is not sufficient to attain the efficiency.

Similar improvement has been proposed in U.S. patent application Ser. No. 838,901 filed on Mar. 12, 1986 (also filed in the United Kingdom, Germany and France) and assigned to the assignee of the present invention, wherein an apparatus has been improved to headtouch with the disc facing the stabilizer member, by forming a slant face for generating positive pressure on the downstream side of the groove of the stabilizer member and by forming the configuration of the groove and the face with suitable angles in conformity with the deformation due to sliding contact of the head with the disc.

However, it is insufficient to get stable and uniform headtouch as the conformity of the slant face with the deformed configuration of he disc for generating positive pressure to press the disc to the head is not enough. That is, there is lack of pressure adjustment in conformity with the difference in rigidity of the disc from the outer circumference to the inner circumference. Therefore, an apparatus capable of gaining stable and uniform headtouch on the whole area of the disc facing the stabilizer member under the upstream side and the downstream side has been expected.

SUMMARY OF THE INVENTION

The primary object of this invention which has been intended for the situations mentioned above is to provide a recording or reproducing apparatus equipped with a stablizer member having least possibility for causing the scratches on the stabilizer member and the disc as well as maintaining stable and uniform facing situations between the head and the flexible disc by simple means.

Under the foregoing objects, according to this invention, the apparatus is equipped with a recording or reproducing head movable in the radial direction of the flexible disc and with a disc stabilizer member which is situated at the position facing the head with the disc put between them and has a grooved part allowing the head to move. The grooved part of the above stabilizer member is formed to have a wider width of the opening at the center side of the disc than at the outer circumference side of the disc. Furthermore, the stabilizer member is formed to have a slant on the downstream side in the rotating direction of the disc and adjacent to the grooved part. The slant creates positive pressure, and its width widens as that goes from the outer circumference side to the center side of the disc.

In other words, while deformation of the disc caused by the sliding contact with the head has a tendency to diminish from the center of the disc to its circumference, the slant for creating positive pressure which is formed on the downstream side of the grooved part of the stabilizer member is constructed so as to narrow its width as that goes from the center side of the disc to the circumference side thereof. Therefore, the force applied to the disc by positive pressure mentioned above becomes nearly uniform from the center side of the disc to the circumference side of the disc, so that more stability can be attained.

Under the foregoing objects also, one of the embodiments of the invention is to equip the apparatus with a recording or reproducing head movable in the radial direction of the flexible disc and a disc stabilizer member situated at the position facing the head with the disc put between them and having a grooved part allowing the head to move, and to stabilize the clearance between the head and the disc by creating a predetermined level of positive pressure through slants provided on the upstream and downstream sides adjacent to the grooved part of the stabilizer member, each slant sloping to the bottom of the grooved part.

With these structures, the stability of the flexible disc during the rotation can be maintained without touching the stabilizer member, uneven rotation of the disc and damages of the disc or the stabilizer member can be prevented, and stabilization of the contact condition of the head and the disc can be attained.

Further, under the foregoing objects, in another embodiment of this invention, a recording or reproducing apparatus for recording or reproducing information through a recording or reproducing head in sliding contact with a rotating flexible disc is equipped with a stabilizer member situated at the position facing the head with the disc put between them for generating positive pressure which presses the disc to the head through the air flow caused by the rotation of the disc. On the surface of the stabilizer member facing the disc, a slant face is formed on each of the upstream side and the downstream side in the rotation direction of the disc. This enables to generate positive pressure uniform from the center of the disc to the circumference in conformity with the deformed configuration of the disc, and to securely prevent contact of the disc with the stabilizer member in addition to maintain the uniform stabilization of the sliding contact between the disc and the head.

Other objects and features of the present invention will become apparent from the description and drawings to follow.

DETAILED DESCRIPTION OF THE PREFERRED EMBODIMENTS

The preferred embodiments of this invention will be described in detail referred to the drawings.

Figure 1:
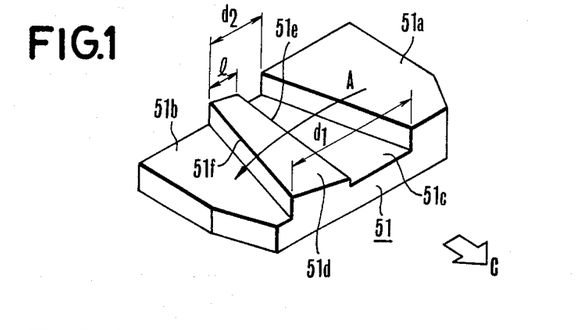
FIG. 1 is a perspective view illustrating a stabilizer member in the first embodiment of this invention.
Figure 2:
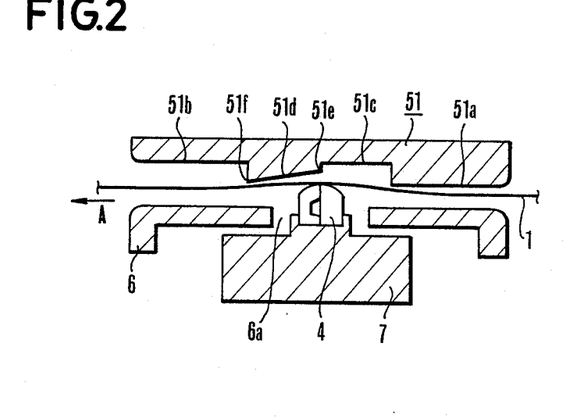
FIG. 2 is a longitudinal cross-section view illustrating the portion adjacent to the head in the first embodiment of this invention.

FIG. 1 shows a surface of a stabilizer member 51 facing the disc 1 viewed diagonally from above in the first embodiment of this invention and FIG. 2 shows the situation the stabilizer member 51 is installed on the apparatus, wherein arrow A shows the direction of the rotation of the disc 1, arrow C the direction to the center core 2.

Figure 14A:
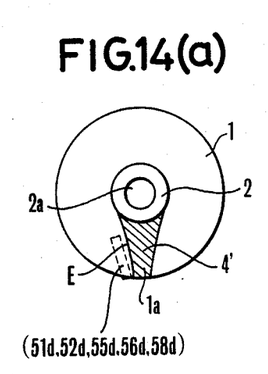
FIG. 14(a) and FIG. 14(b) are a plane view and a perspective view illustrating respectively the deformed configuration of the flexible disc.
Figure 14B:
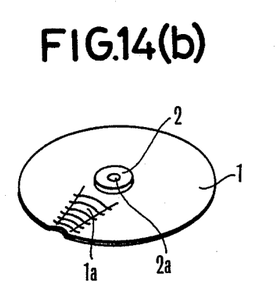

As shown in FIG. 14(a) and FIG. 14(b), the flare of deformation in the direction of the disc circumference on the disc 1 caused by protruding the head 4, is wider at the center side of the rotation of the disc 1 and narrower to the radial direction from the center under the influence of the center core 2.

Accordingly, the configuration which is figured by a grooved part 51c formed a the position facing the disc 4 for recessing the head 4 and by a slant face 51d of the stabilizer member 51 shown in FIG. 1 is made such that the width $d_1$ on the center side of the disc is wider than the width $d_2$ on the outer circumference side of the disc in conformity with the above deformation (1a) of the disc 1. Further, in conjunction with this, the stabilizer member 51 mentioned above is provided with a surface 51a facing the disc 1 on the upstream side, and with the slant 51d and a facing surface 51b on the downstream side in the rotating direction of the disc 1 with the grooved part 51c forming the boundary.

In this part of the apparatus, the slant 51d for generating positive pressure is made along the ridgelines 51e and 51f on the downstream side adjacent to the grooved part 51c, and the width l of the slant 51d becomes wider as that goes in the direction of arrow C. The slant 51d is formed with a predetermined inclination on the basis of the deformed configuration of the part of the disc 1 which passes through the slat 51d in order to make a required acute angle, that is, the acute angle to get required positive pressure at a predetermined rotation speed of the disc 1, in the moving direction of the disc relative to the part of the disc passing through the slant 51d.

The surface 51b facing the disc is, also, put backward enough from the disc to have ambient atmosphere pressure between the disc 1 and the surface 51b.

According to the structure of the stabilizer member 51 mentioned above, referring to FIG. 2, when the magnetic head 4 is protruded while the disc 1 is in rotation, positive pressure is arisen by the slant 51d, and the disc 1 in this part is pressed downward as shown in FIG. 2, that is, in the direction away from the facing surface 51b on the downstream side. Positive pressure which is arisen by the slant 51d is determined by the gap configuration between the disc 1 and the slant 51d, that is, the angle formed between the disc 1 and the slant 51d and the width of the slant 51d. The angle formed between the disc 1 and the slant 51d is set such that positive pressure generated on the inner circumference side of the disc 1 is smaller than on the outer circumference side, according to the difference of the deformed configuration of the disc 1 between the portions on the outer and inner circumference sides.

On the other hand, the wider the width of the slant 51d becomes, the larger the power to press the disc 1 becomes. Therefore, the slant 51d presses the disc 1 on the inner circumference side as much as on the outer circumference side, because the width of the slant 51d is larger on the inner circumference side when compared with that on the outer circumference side of the disc 1, that is, the force to separate the disc from the facing surface 51b by positive pressure becomes nearly the same both on the inner and outer circumference sides.

By reason of the above mentioned, the disc 1 is pressed effectively to prevent the possibility of touching the stabilizer member 51, and the facing conditions between the head 4 and the disc 1 are maintained in good conditions.

Figure 3:
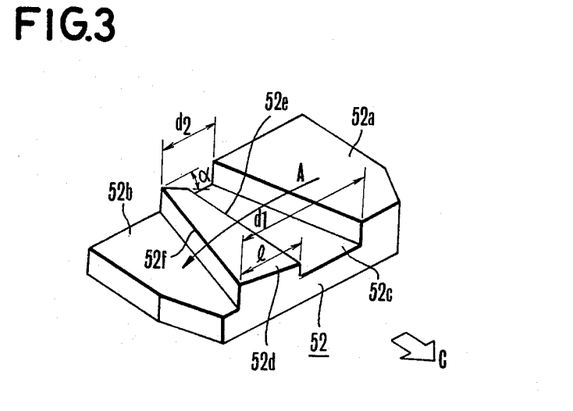
FIG. 3 is a perspective view illustrating a stabilizer member in the second embodiment of this invention.

FIG. 3 shows a surface of a stabilizer member 52 facing the disc viewed diagonally from above as the second embodiment of this invention. In the foregoing embodiment, the inclination of the slant 51d is mentioned as fixed, but as shown in FIG. 3, a slant 52d is formed to have a larger width l as that goes in the direction of arrow C, and the inclination 2 becomes smaller as that goes in the direction of the inner circumference side of the disc in accordance with the deformed configuration of the disc. And thus, the force applied to the disc by possitive pressure can be uniformly adjusted both on the inner and outer circumference sides.

Further, in FIG. 3, a facing surface 52b on the downstream side may be cut off as the surface 52b is recessed enough from the disc 1 by maintaining ambient atmospheric pressure.

Figure 4:
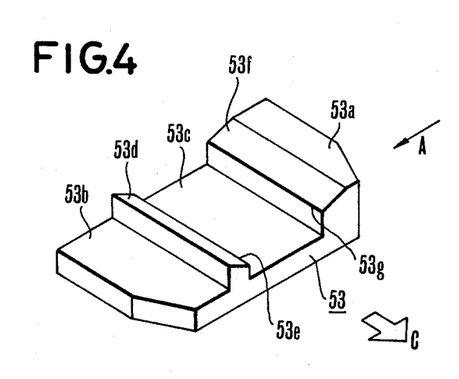
FIG. 4 is a perspective view illustration a stabilizer member in the third embodiment.
Figure 5:
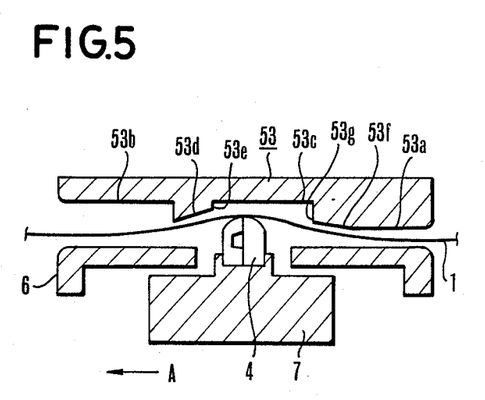
FIG. 5 is a longitudinal cross-section view illustrating the portion adjacent to the head in the third embodiment of this invention.

FIG. 4 shows a surface of a stabilizer member 53 facing the disc viewed diagonally from above, and FIG. 5 shows an apparatus installed with the stabilizer member 53.

As for the stabilizer member 53 shown here, with a grooved part 53c for recessing the head 4 forming the boundary, a slant 53f for generating positive pressure is formed adjacent to the grooved part 53c along an upstream side ridgeline 53g and sloping down to the grooved part 53c, on a surface 53a facing the disc 1 on the upstream side in the rotating direction of the disc 1. As for the surface 53b facing the disc 1 on the downstream side, a slant 53d for generating positive pressure is formed adjacent to the grooved part 53c along a downstream side ridgeline 53e and sloping down to the grooved part 53c. The slant 53f is formed, as shown in FIG. 5, with a predetermined inclination based on the deformed configuration of the part of the disc 1 that passes through the slant 53f to substantially have a required acute angle, that is, the acute angle capable of obtaining a required positive pressure, in the moving direction of the part of the disc 1 that passes through the slant 53f at a predetermined rotating speed of the disc 1, in order to prevent the disc from touching as well as to generate a suitable level of positive pressure between the slant 53f and the part of the disc 1 passing through the slant 53f when the disc 1 is rotating in the direction of arrow A.

Further, the slant 53d is formed, as shown in FIG. 5, with a predetermined inclination based on the deformed configuration of the part of the disc 1 that passes through the slant 53d to substantially have a required acute angle, that is, the acute angle capable of obtaining a required positive pressure, in the moving direction of the part of the disc 1 that passes through the slant 53d at the predetermined rotating speed of the disc 1, in order to generate a suitable level of positive pressure between the slat 53d and the part of the disc 1 passing through the slant 53d.

According to the structure of the stabilizer member 53 mentioned above, when the disc 1 shown in FIG. 5 is rotated, a suitable positive pressure on the upstream side is arisen by the slant 53f, and a positive pressure on the downstream side is arisen by the slant 53d. Therefore, the disc 1 is pressed downward in FIG. 5, that is, away from the stabilizer member 53, so that the possibility of touching both on the upstream side and on the downstream side can be dissolved. And in this case, as the positive pressure acts on the disc 1 at both the ends of the upstream and downstream sides of the grooved part 53c, that is, at nearly the key points of the deformation caused by the protrusion of the head 4, prevention of contact between the disc 1 and the stabilizer member 53 can be attained more efficiently.

Figure 6:
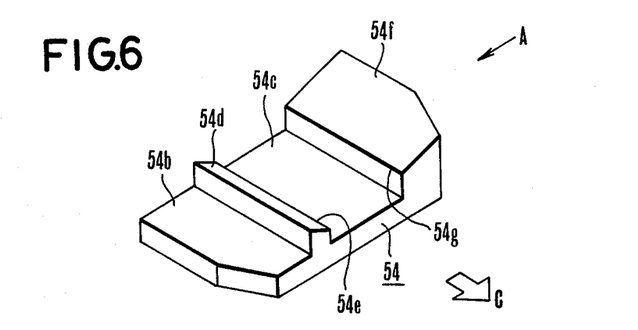
FIG. 6 is a perspective view illustrating a stabilizer member in the fourth embodiment of this invention.

FIG. 6 shows a surface of a stabilizer member 54 facing the disc viewed diagonally from above as the fourth embodiment of this invention.

When positive pressure is to be gained more positively on the upstream side in the rotating direction of the disc, the whole of the surface facing the disc on the upstream side, as shown in FIG. 6, may be composed of the slant 54f for generating positive pressure.

Figure 7:
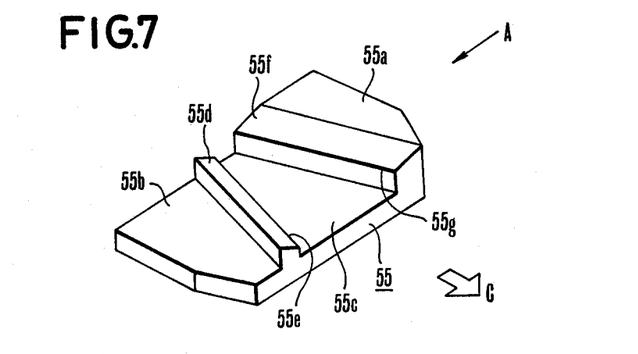
FIG. 7 is a perspective view illustrating a stabilizer member in the fifth embodiment of this invention.

Further, as the fifth embodiment of this invention shown in FIG. 7, a stabilizer member 55 with a grooved part 55c for recessing the head formed in such a manner that the width of the opening on the center side of the disc, that is, in the direction of arrow C, is larger than that on the outer circumference side of the disc, can be used to actively gain positive pressure on the upstream side by forming on the upstream side a slant 55f for generating positive pressure. Namely, when the head 4 is in the sliding contact with the flexible disc 1, the disc 1 is deformed by protruding the head 4 as shown in FIG. 14(a) and FIG. 14(b). And the deformed configuration is such that the width of the configuration is wide on the center side of the rotation of the disc under the influence of the center core 2 of the disc 1 and becomes narrower as that goes from the center to the outer circumference side of the disc in a radial direction.

Therefore, by forming the width of the grooved part 55c wider as that goes from the center side to the outer side of the disc, in conformity with this deformed configuration, the slants 55d and 55f can be positioned according to the condition of the deformed configuration of the disc 1, and even if the disc is under the uneven tension due to the center core 2, a stable condition of the gap between the disc and the stabilizer member can be gained at the whole disc from the inner circumference side to the outer circumference side of the disc.

Figure 8:
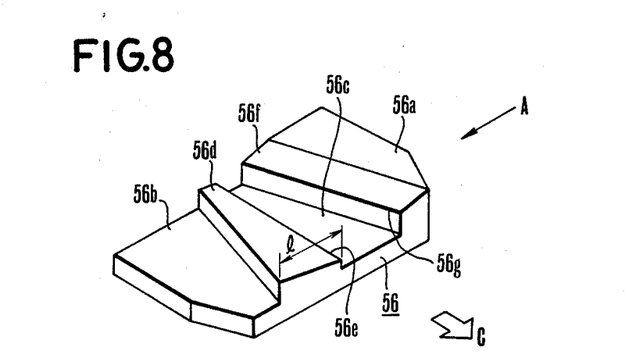
FIG. 8 is a perspective view illustrating a stabilizer member in the sixth embodiment of this invention.

FIG. 8 also shows the sixth embodiment of this invention. In consideration of the deformed configuration by the extrusion of the head 4 when slide contacting with the disc 1 mentioned above, the width of a slant 56d formed on the downstream side in the rotating direction of the disc becomes wider as that goes from the outer circumference side to the inner circumference side, that is, in the direction of arrow C, so that positive pressure generated by the slant 56d can be uniform between the outer and inner sides of the disc. By the way, a slant 56f on the upstream side may be formed as well as the slant 56d on the downstream side.

Figure 9:
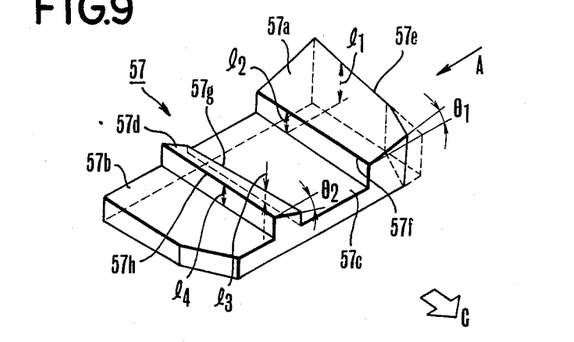
FIG. 9 is a perspective view illustrating a stabilizer member in the seventh embodiment of this invention.
Figure 10:
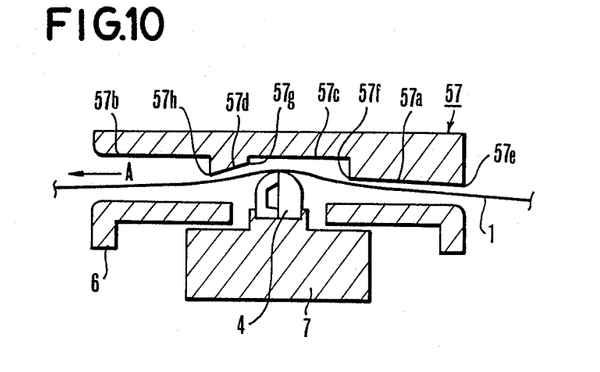
FIG. 10 is a longitudinal cross-section view showing the portion adjacent to the head in the seventh embodiment of this invention.

FIG. 9 shows a surface of a stabilizer member 57 facing the disc viewed diagonally from above, and FIG. 10 shows a condition in which the stabilizer member 57 is attached to the apparatus.

As shown in the figures, the stabilizer member 57 is formed nearly as a trapezoid shaped plate as a whole. In the middle part of the surface of the stabilizer member 57 facing the disc, as is the case with prior arts, a concave 57c with a predetermined width is formed in conformity with the moving path of the head 4 to avoid the head 4. And on the downstream side at a little farther in the direction of arrow A (the rotating direction of the disc), a second concave 57b is formed.

And adjoining on the upstream side of the concave 57c in the direction of arrow A, a first slant 57a is protrusively formed, and on the downstream side of the concave 57c in the direction A, a second slant 57d with a narrow width for generating positive pressure is protrusively formed between the concaves 57c and 57b. A ridgeline 57f on the side edge of the slant face 57a contacting the concave 57c is fixed in height $l_2$ from the bottom of the concave 57c. A ridgeline 57e on the side edge opposite to the side edge mentioned above is gradually decreased in height $l_1$ in the direction C, that is, in the inner circumference direction of the disc 1, and even the lowest height shown foreground in FIG. 9 is higher than the height $l_2$.

The slant 57a is, namely, sloping to the bottom of the concave 57c, and the inclination $\theta_1$ diminishes as that goes to the inner side of the disc 1. Further, the inclination $\theta_1$ is determined to conform to the deformed configuration of the part of the disc 1 that is deformed through being pressed by the head 4 to make an acute angle for gaining required positive pressure with a predetermined rotating speed of the disc 1 in the moving direction of the part of the disc 1 passing under the slant 57a in the direction of arrow A.

Meanwhile, a ridgeline 57h on the side edge of the slant face 57d contacting the concave 57b is fixed in height $l_4$ from the bottom of the concave 57b, the bottom of which is on the same level as that of the concave 57c. The height $l_3$, from the bottom of the concave 57c, of a ridgeline 57g of the slant face 57d facing to the concave 57c is shorter than the height $l_4$ and becomes higher as that goes in the direction of arrow C.

The slant 57d is also sloping to the bottom of the concave 57c and the inclination $\theta_2$ becomes narrower as that goes to the inner side of the disc 1. The inclination $\theta_2$ is determined to conform to the deformed configuration of the part of the disc 1 to make an acute angle for gaiing required positive pressure in the moving direction of the disc 1 passing under the slant 57d.

According to the structure of the stabilizer member 57 mentioned above, when the disc 1 is rotating as shown in FIG. 10, positive pressure is created by an air flow between each of the slants 57a and 57d and the disc 1. Namely, positive pressure is originated on both of the upstream and downstream sides in the direction A relative to the head 4, and the disc 1 is pressed in the direction away from the stabilizer member 57, and the protruded disc 1 is pressed to the facing head side.

In this case, positive pressure which is originated at the slants 57a and 57d is determined by the gap configuration between the disc 1 and each of the slants 57a and 57d, but the gap configuration is nearly constant because the slants 57a and 57d correspond to the deformation of the disc 1.

Figures 11A, 11B:
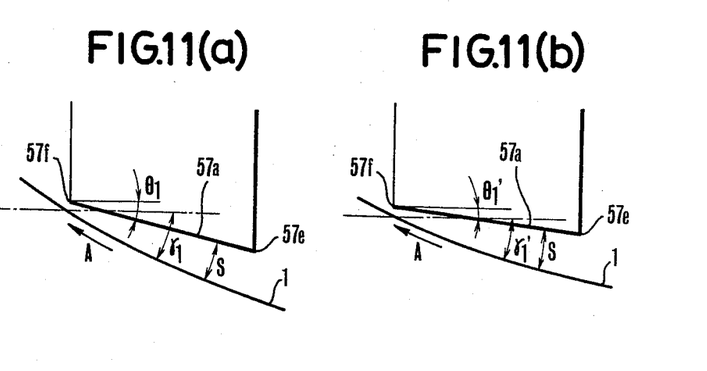
FIG. 11(a) and FIG. 11(b) are views for explaining the relation between the slant face of the stabilizer member and the disc in the seventh embodiment of the invention.

FIG. 11(a), FIG. 11(b), FIG. 12(a) and FIG. 12(b) show these aspects. FIG. 11(a) shows the relationship between the deformation around the outer circumference of the disc 1 and the slant face 57a on the upstream side in the direction A relative to the head 4, FIG. 11(b) shows the relationship between the deformation around the inner circumference of the disc 1 and the slant 57a. As for the inclination $\gamma_1$ or $\gamma_1'$ of the deformed part of the disc 1 that is made by pressing, the inclination $\gamma_1'$ on the inner side becomes smaller than the inclination $\gamma_1$ on the outer side under the influence of the center core 2 that holds the center of the disc. Corresponding to this, as the slant angles $\theta_1$ and $\theta_1'$ of the slant 57a mentioned above are smaller on the inner side, the gap configuration between the slant 57a and the disc 1 becomes constant on both the outer and inner sides of the disc 1.

Figure 12A:
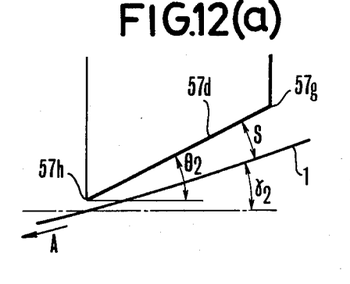
FIG. 12(a) and FIG. 12(b) are views for explaining the relation between the slant face of the stabilizer member and the disc in the seventh embodiment of this invention.
Figure 12B:
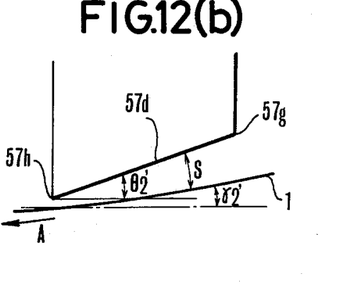

FIG. 12(a) shows, also, the relationship between the deformation around the inner circumference of the disc 1 and the slant 57d on the downstream side in the direction A relative the head 4, and FIG. 12(b) shows the relationship between the deformation around the inner circumference of the disc 1 and the slant 57d. As for the inclination $\gamma_2$ of $\gamma_2'$ of the deformed part of the disc 1, the inclination $\gamma_2'$ on the inner circumference side becomes smaller compared with the inclination $\gamma_2$ on the outer circumference side under the influence of the center core 2. Corresponding to this, as the inclinations $\theta_2$ and $\theta_2'$ of the slant 57d mentioned above are smaller on the inner side, the gap configuration between the slant 57d and the disc 1 becomes nearly constant on both the outer and inner sides of the disc 1.

In this way, as the gap configuration between each of the slants 57a and 57d and the disc 1 is nearly constant on the outer side and the inner side of the disc 1, similar size of positive pressure is gained on the outer side and the inner side of the disc 1, and the disc 1 is uniformly pressed.

Further, in the gap configuration between the slant 57a or 57d and the disc 1, when the rate of change in the gap measurement S in the direction of arrow A reaches a certain value, the maximum positive pressure will arise. However, since the rate of change is considered to be nearly "0", it is to be considered that the larger the rate of change in the gap measurement S in the direction of A becomes, the smaller the generated positive pressure becomes. This is also applied to the embodiments mentioned above.

According to this embodiment mentioned above, on the stabilizer member 57, positive pressure is originated in each of the upstream and downstream sides in the rotating direction of the disc relative to the head 4 through the slants 57a and 57d, so that the stabilizer member 57 can be prevented from the contact with the disc 1.

Therefore, the problems such as the instability of the sliding contact between the head and the disc, breakages of the disc or the stabilizer member, abnormal rotations of the disc and wear of the head caused by contacting of both that have been observed in the prior art can be avoided.

According to this embodiment, also, positive pressure can be gained nearly uniformly on the inner side and the outer side of the disc for each of the slants 57a and 57d, so that the disc 1 can be pressed uniformly, and stable and smooth sliding contact can be gained between the disc 1 and the head 4, to attain fine recording and reproducing.

Figure 13:
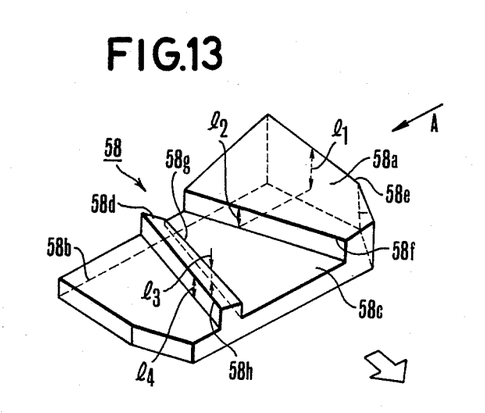
FIG. 13 is a perspective view illustrating a stabilizer member in the eighth embodiment of this invention.

Further, FIG. 13 shows the structure of a stabilizer member 58 as the eighth embodiment of this invention. The stabilizer member 58 differs from the embodiment mentioned above in that the width of a concave 58c is formed to become large in the direction of arrow C, that is, toward the inner circumference of the disc, while, accordingly, the width of a concave 58b is formed to become smaller in the direction of arrow C.

According to such a structure, when compared with the above embodiment, even if the heights $l_2$ and $l_4$ and the differences in heights $l_3$ and $l_1$ between the outer and inner sides of the disc are the same, the difference between the angles that each of the slants 58a and 58d forms on the outer and inner sides is larger than that of the preceding embodiment due to the difference of the gap between the slants 58a and 58d on the outer and inner sides. Therefore, the relationship between each of the slants 58a and 58d and the deformation of the disc 1 differing between the outer and inner sides becomes closer, and the disc 1 can be pressed more stably.

Besides, the head 4 and the disc 1 are mentioned to be in sliding contact in each embodiment mentioned above, but it goes without saying that the head 4 and the disc 1 are in sliding contact with a thin air film put between them.

What is claimed is:

1. A recording and reproducing apparatus comprising a recording or reproducing head movable in a radia direction of a flexible disc having a central area and a peripheral area radially outward of the central part, and a stabilizer member disposed opposite to said head and positioned beyond said disc so that said disc is located between said stabilizer member and said head, said stabilizer member being provided with a grooved part disposed thereon opposite to said head and positioned beyond said disc for allowing said head to move, a width of said grooved part in proximity of the central area of said disc being larger than a width of the peripheral area of said disc, a slant surface for generating positive pressure being formed adjacent to said grooved part on a downstream side in a rotating direction of the disc relative to said grooved part, a width of said slant surface in the central area of the disc being larger than that in the outer peripheral area of the disc.

2. An apparatus according to claim 1, wherein said slant surface is formed on an edge part of said grooved part.

3. An apparatus according to claim 1 or claim 2, wherein said slant surface is formed on a whole area along said grooved part.

4. An apparatus according to claim 3, wherein said slant surface has a fixed inclination.

5. An apparatus according to claim 1, wherein said slant surface is formed such that its inclination angle becomes smaller as that goes from the outer peripheral area to the central area of the disc.

6. An apparatus according to claim 1, wherein said grooved part has a configuration in conformity with a deform characteristic of the disc caused by the sliding contact between the disc and the head.

7. An apparatus according to claim 1, wherein a recessed area is formed on a plane of said stabilizer member facing the disc in a downstream side in a rotating direction of the disc relative to said slant.

8. An apparatus according to claim 7, wherein the depth of said recessed area is arranged so that said recessed area is kept in approximately ambient pressure while rotating the disc.

9. An apparatus according to claim 1, 6 or 7, wherein the depth of said grooved part is arranged so that said grooved part is kept in approximately ambient pressure while rotating the disc.

10. A recording or reproducing apparatus comprising a recording or reproducing head movable in a radial direction of a flexible disc, and a stabilizer member disposed opposite to said head and positioned beyond said disc so that said disc is located between said stabilizer member and said head, said stabilizer member being provided with a grooved part thereon disposed opposite to said head and positioned beyond said disc for allowing said head to move, slant faces sloping to said grooved part being formed adjacent to said grooved part on both sides of said grooved part, a recessed area being formed on a far downstream side of said slant face situated on the downstream side in the rotating direction of the disc relative to said grooved part.

11. An apparatus according to claim 10, wherein said slant faces are formed on edge parts of said grooved part.

12. An apparatus according to claim 10 or 11, wherein said slant faces are formed on a whole area along said grooved part.

13. An apparatus according to claim 10, wherein at least one of said slant faces is formed on a whole surface facing said disc of said stabilizer member.

14. An apparatus according to claim 10, wherein said slant faces are formed on both sides of said grooved parts, and one formed on the downstream side in the rotating direction of the disc has a larger inclination.

15. An apparatus according to claim 10, wherein a moving path of said head is positioned close to the downstream side relative to the center of said grooved part.

16. An apparatus according to claim 10, wherein a width of said grooved part in proximity of the central area of said disc is larger than a width of the peripheral area of said disc.

17. An apparatus according to claim 10 or 16, wherein at least one of said slant surfaces is formed such that its width becomes narrower as that goes from the central side of the disc to the outer circumference side of the disc.

18. An apparatus according to claim 10 or 16, wherein said grooved part is formed to conform with the deform characteristic of the disc caused by the sliding contact between said disc and said head.

19. An apparatus according to claim 10, wherein said grooved part and said recessed area are kept in pressure nearly equal to ambient pressure while rotating the disc.

20. A recording or reproducing apparatus for recording or reproducing information with a recording or reproducing head being in sliding contact with a rotating flexible disc, comprising a stabilizer member for generating positive pressure to press said disc to said head by the air flow caused by the rotation of said disc, said stabilizer member being disposed opposite to said head and positioned beyond said disc so that said disc is located between said stabilizer member and said head, and stabilizer member being provided with slant faces for generating positive pressure with varied inclinations in conformity with configurations of said disc that change with the sliding contact of said head, said slant surfaces being formed at a surface of said stabilizer member facing the disc on each of the upstream and downstream sides in the rotating direction of said disc.

21. An apparatus according to claim 20, wherein each of said slant surfaces and a facing part of said disc make an acute angle in the rotating direction of said disc on a whole surface.

22. An apparatus according to claim 20, wherein said slant surface on the downstream side is narrower in width compared with said slant on the upstream side.

23. An apparatus according to claim 20, wherein said each of said slant surfaces is formed to gradually decrease the inclination as that goes from the center of said disc to the outer side of said disc.

24. An apparatus according to claim 20 or 23, wherein a grooved part for allowing said head to move along a moving path of said head is formed on a part of said stabilizer member situated between said slant surface on the upstream side and said slant surface on the downstream side, the width of said grooved part in proximity of the inner area of said disc being larger than the width of the peripheral area of said disc.

25. An apparatus according to claim 24, wherein said grooved part is kept in ambient pressure while rotating the disc.

26. An apparatus according to claim 20, wherein a recessed area is formed on the downstream side of said slant surface on the downstream side in the rotating direction of the disc.

27. An apparatus according to claim 25, wherein said recessed part is kept in ambient pressure while rotating the disc.

* * * * *